United States Patent
Vignotto et al.

(10) Patent No.: US 7,118,280 B2
(45) Date of Patent: Oct. 10, 2006

(54) SEALING DEVICE FOR A ROLLING CONTACT BEARING

(75) Inventors: Angelo Vignotto, Turin (IT); Andrea Griseri, Turin (IT); Francesco Savarese, Airasca (IT)

(73) Assignee: SKF Industries S.p.A., Turin (IT)

( * ) Notice: Subject to any disclaimer, the term of this patent is extended or adjusted under 35 U.S.C. 154(b) by 138 days.

(21) Appl. No.: 10/450,721

(22) PCT Filed: Sep. 17, 2001

(86) PCT No.: PCT/EP01/10709

§ 371 (c)(1),
(2), (4) Date: Dec. 1, 2003

(87) PCT Pub. No.: WO02/053955

PCT Pub. Date: Jul. 11, 2002

(65) Prior Publication Data

US 2004/0071377 A1 Apr. 15, 2004

(30) Foreign Application Priority Data

Dec. 28, 2000 (IT) .......................... TO2000A1222

(51) Int. Cl.
*F16C 33/78* (2006.01)

(52) U.S. Cl. ...................................... 384/484; 384/486

(58) Field of Classification Search ................ 384/478, 384/484, 486; 277/351, 353, 551, 562, 572, 277/576, 549, 571, 577
See application file for complete search history.

(56) References Cited

U.S. PATENT DOCUMENTS

| | | | | |
|---|---|---|---|---|
| 5,022,659 | A * | 6/1991 | Otto | 384/486 |
| 5,947,611 | A * | 9/1999 | Nagase | 384/448 |
| 5,975,534 | A * | 11/1999 | Tajima et al. | 277/353 |
| 6,206,380 | B1 * | 3/2001 | Miyazaki | 277/551 |
| 6,217,225 | B1 * | 4/2001 | Shimizu et al. | 384/589 |

FOREIGN PATENT DOCUMENTS

| | | |
|---|---|---|
| DE | 89 16 056 U | 4/1993 |
| EP | 0 902 203 A | 3/1999 |
| FR | 1 071 374 A | 8/1954 |

* cited by examiner

*Primary Examiner*—Thomas R. Hannon
(74) *Attorney, Agent, or Firm*—Merchant & Gould P.C.

(57) ABSTRACT

Sealing device for a rolling contact bearing (2) provide with a first shield (5) and second shield (7) which a re made of metal material and which are respectively coupled to an outer race (4) and an inner race (3) of the rolling contact bearing (2) itself, and a seal (10) which is made of synthetic material and which is integral to the first shield (5) and which presents a sealing lip (11) which is arranged substantially in contact with the second shield (7); the first shield (5) is defined by a cylindrical portion (15) which is assembled on the outer race (4), and the seal (10) is anchored to the cylindrical portion (15) in order to freely extend from and overhand the cylindrical portion (15) itself and presents, in axial section, a tapering shape towards a cylindrical sliding surface (13) of the second shield (7).

7 Claims, 1 Drawing Sheet

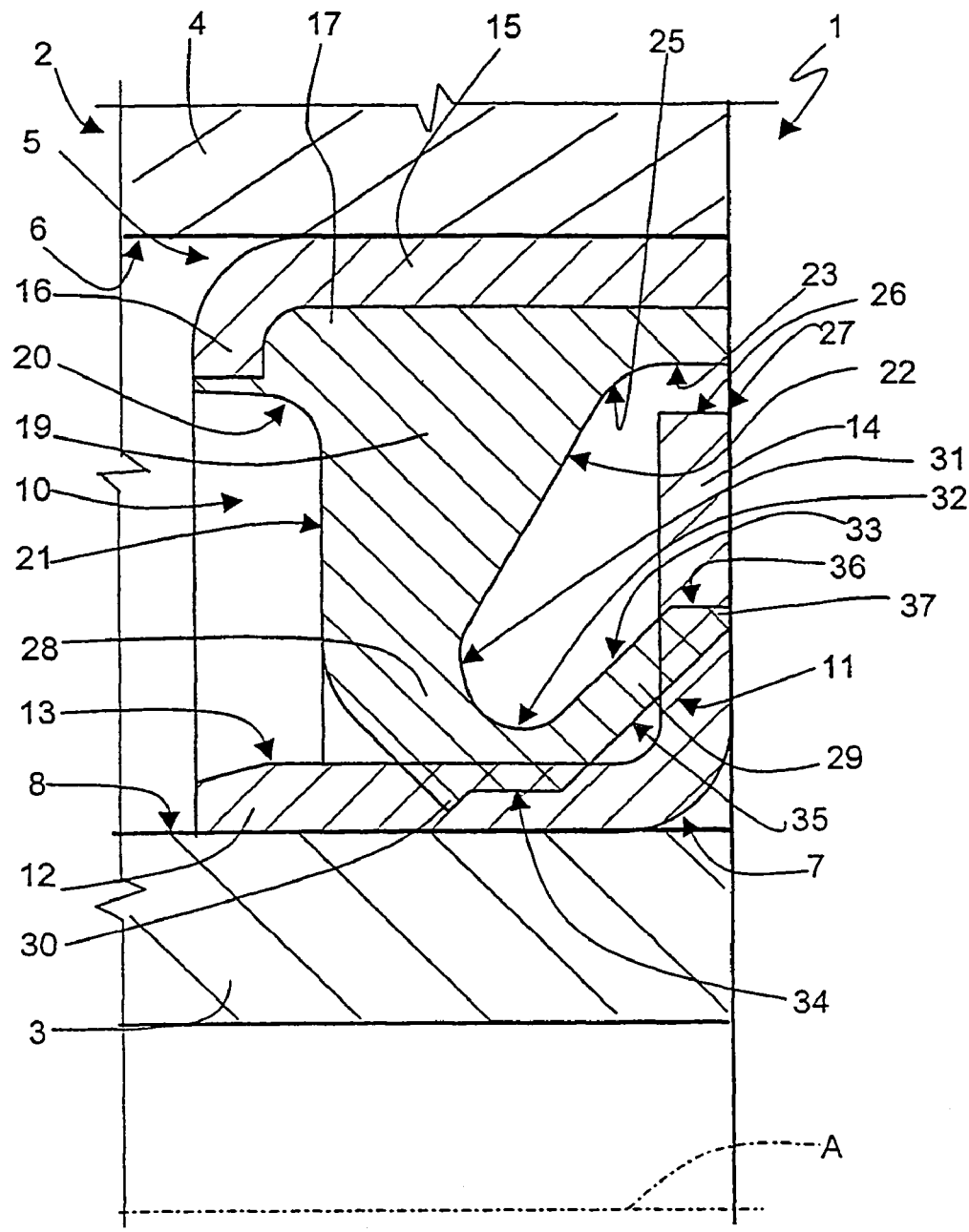

SEALING DEVICE FOR A ROLLING CONTACT BEARING

DESCRIPTION

The present invention relates to a sealing device for a rolling contact bearing.

Sealing devices of a well-known type are assembled between an inner race and an outer race of a rolling contact bearing in order to prevent the entry of solid impurities and the leakage of lubricant and they usually comprise a first shield which is made of metal material and which is coupled to the outer race, a second shield which is made of metal material and which is coupled to the inner race and is frontally arranged to the first shield, and a seal which is made of synthetic material and which is integral to the first shield and which is provided with a sealing lip which extends between the two shields and which is arranged substantially in contact with at least one cylindrical sliding surface of the second shield.

The first shield comprises an annular portion which extends transversely to the cylindrical surface and which is substantially integral with the seal apart from the sealing lip, which defines the only axially free element of the seal itself. This kind of structure limits the elastic characteristics of the sealing lip, on which, therefore, an annular spring is assembled which is suitable for maintaining the sealing lip itself in contact with the sliding surface in such a way as to overcome any eventual errors of assembly and any wear in the seal due to friction arising from its contact with the cylindrical surface itself.

Sealing devices of the kind which has just been described have proved to be extremely reliable, but they have presented some disadvantages which are mainly due to the presence of the annular spring, the reduced dimensions of which do not permit an appropriate modulation of the contact pressure of the sealing lip on the sliding surface with the result that the effective working life of the seal itself is reduced. In addition, it has been discovered that the assembly of the second shield frequently causes rotation errors in an axial direction of the second shield itself with the result that the sealing characteristics and working life of the seal are reduced even further.

The aim of the present invention is to produce a sealing device for rolling contact bearings which will solve the above-mentioned problems in a simple and cost-effective fashion.

According to the present invention, a sealing device for a rolling contact bearing will be produced comprising an inner race and an outer race which are coaxial to each other and a rotation axis of the rolling contact bearing itself; the device comprises a first shield made of metal material which is coupled to the external race, a second shield made of metal material which is coupled to the inner race and a seal made of synthetic material which is integral to the first shield and which is provided with a sealing lip which is substantially arranged in contact with the second shield; the device is characterised by the fact that the first shield is defined by a cylindrical portion which is assembled on the outer race of the rolling contact bearing; the said seal is anchored to the cylindrical portion in order to freely extend from and overhang the cylindrical portion itself, and it presents, in axial section, a tapering shape towards a cylindrical sliding surface of the second shield.

The invention will now be described with reference to the attached drawing which illustrates, in axial section and with some parts removed for reasons of clarity, a preferred form of embodiment of the present invention which is provided as an example and which is in no way limiting.

With reference to FIG. 1, the number 1 indicates a sealing device in its entirety for a rolling contact bearing 2 comprising an inner race 3 and an outer race 4 which are coaxial in relation to each other and to a rotation axis A of the rolling contact bearing 2 itself.

The device 1 comprises a first shield 5 which is made of metal material and which is assembled under an internal cylindrical surface 6 of the outer race 4, a second shield 7 which is made of metal material and which is assembled under/below an external cylindrical surface 8 of the inner race 3, and a seal 10 which is made of synthetic material and which is integral to the first shield 5 and which is provided with a sealing lip 11 which is arranged substantially in contact with the second shield 7.

The second shield 7 comprises a cylindrical portion 12 which is assembled in contact with the surface 8 and which is radially limited towards the outside by a sliding surface 13 and a flange 14 which is transverse to the portion 12 and which is arranged to face the outside of the rolling contact bearing 2.

Instead, the first shield 5 comprises a cylindrical portion 15 which is assembled in contact with the surface 6 in a frontal position to the portion 12, and a flange 16 which is transverse to the portion 15 and which presents a radial development which is considerably less than a radial development of the flange 14.

The seal 10 is anchored both to the flange 16 and the cylindrical portion 15 in order to freely extend from and overhang the cylindrical portion 15 itself. In particular, the seal 10 comprises a base body 17 which is anchored in a radial direction to the cylindrical portion 15 and in an axial direction to the flange 16, a sealing lip 11 which is arranged in substantial contact with the second shield 7, and an intermediate connecting body 19 of the lip 11 to the body 17.

The body 19 presents a lateral notch 20 which is axially open towards the inside of the rolling contact bearing 2, and which is axially defined towards the outside of the rolling contact bearing 2 itself by a flat surface 21 which is transverse to the axis A. The notch 20 is arranged so as to be axially aligned to the flange 16 and, therefore, it limits the radial development of the flange 16 itself. In addition, the body 19 presents, in axial section, a tapering shape towards the sliding surface 13, and it is axially limited on the opposite side of the surface 21 by a tapered surface 22 which is arranged with its concave section towards the outside of the rolling contact bearing 2.

On the part of the flange 16 which is not anchored, the body 17 is radially limited towards the inside by a cylindrical surface 23, which is connected to the surface 22 by a cylindrical connecting surface 25 with a curved generating line, and which defines, with an upper edge 26 of the flange 14, an annular window 27. The window 27 and the arrangement of the connecting surface 25 and the surface 22 all combine to facilitate the expulsion of contaminating agents from inside the device 1 when it is in use.

The sealing lip 11 is substantially U-shaped with its own concave portion turned towards the outer race 4 and towards the outside of the rolling contact bearing 2, and it comprises a first arm 28 which extends from the connecting body 19 towards the sliding surface 13, and a second arm 29 which extends from the surface 13 towards the flange 14, with which it comes into contact.

The second arm 29 presents a thickness which is substantially constant along the whole of its length, while the first arm 28 presents a thickness which decreases as it extends towards the surface 13, and in correspondence to its junction with the second arm 29 it presents a thickness which is even greater to that of the second arm 29 itself in such a way as to form a sharp annular edge 30 which is arranged in contact with the surface 13.

On the part opposite that which presents the sharp edge 30, the first arm 28 is limited by a curved surface 31 which is connected to the surface 22, while the second arm 29 is radially limited towards the inside of the seal 10 by a respective curved surface 32 which is connected to the surface 31, and by a flat surface 33 which is connected to the surface 32, and, radially towards the outside of the seal 10, by two flat surfaces 34 and 35, of which the surface 34 is used in the formation of the sharp edge 30, and the surface 35 is parallel to the surface 33 and forms an obtuse angle with the surface 34.

In correspondence with the free end of the arm 29, the surfaces 34 and 35 are joined to each other by a further flat surface 36 which defines, with the surface 35, a bevelled sharp edge 37 which forms a contact between the lip 11 and the flange 14.

When the device 1 has been pre-assembled in such a way that the seal 10 is already arranged in contact with the second shield 7, and in such a way that the two cylindrical portions 12 and 15 are substantially aligned in an axial direction, the device 1 itself is assembled onto the rolling contact bearing 2 by inserting the first shield 5 under the surface 6 of the outer race 4, and by inserting the second shield 7 under the surface 8 of the inner race 3.

The assembly of the device 1 determines the positioning of the seal 10 in a working configuration, in which the lip 11 becomes substantially squashed and is arranged, with the sharp edges 30 and 37, in contact with the surface 13 and the flange 14 and in which the connecting body 19 is subjected to a degree of flexure such that the fibres arranged in correspondence to the flexed surface 22 are in traction while the fibres arranged in correspondence to the surface 21 are compressed. The resistance of the body 19 to flexure determines a "spring effect" on the lip 11 which, therefore, is pushed further towards the second shield 7. The "spring effect" will last throughout the useful working life of the device 1 and will thus guarantee, on the one hand, that the seal 10 will not wear out due to friction and, on the other hand, that the friction itself will be reduced and modulated with the result that the working life of the device 1 itself will be considerably prolonged.

In fact, the shape of the body 19 and the fact that it is inherently possible for it to flex freely without any further structural constraint and, finally, the fact that the body 19 and the lip 11 behave in different ways in terms of deformation, guarantee the contact between the sharp edges 30 and 37 without reducing the sealing effect in any way and make the lip 11 itself more elastic and modulate the contact pressure of the sharp edges 30 and 37 themselves while reducing the effective working temperature and increasing the working life of the device 1.

The fact that the seal 10 can function independently to adapt its own working configuration under different conditions of wear means, above all, that it can also overcome any eventual errors of assembly concerning the two shields 5 and 7, with the result that the assembly itself becomes less problematical.

It is intended that the present invention should not be limited to the form of embodiment herein described and illustrated, which is intended as an illustration of a form of embodiment of the sealing device for a rolling contact bearing, which may be subject to further modifications in terms of the shape and arrangement of its parts and details pertaining to its construction and assembly.

The invention claimed is:

1. A sealing device for a rolling contact bearing including an inner race and an outer race coaxial to each other and a rotation axis of the rolling contact bearing, the sealing device comprising:
   a first metal shield including a cylindrical portion assembled on the outer race of the rolling contact bearing and a flange integral to the cylindrical portion;
   a second shield formed from metal coupled to the inner race; and
   a seal of synthetic material and anchored to the cylindrical portion of the first shield to freely extend from and overhang the cylindrical portion; wherein the seal has a shape in axial section tapering towards a cylindrical sliding surface of the second shield, and including a sealing lip substantially in contact with the second shield and a lateral notch axially open towards the inside of the rolling contact bearing; wherein the notch further radially limits towards the inside of the flange and is axially limited towards the outside of the rolling contact bearing by a level surface transverse to the rotation axis;
   wherein the seal includes a tapered surface which is axially open towards the outside of the rolling contact bearing and defines, together with the level surface, a connecting section between the scaling lip and the cylindrical portion of the first shield; wherein the resistance of the connecting section to a determined flexure maintains the sealing lip in contact with the sliding surface daring variations in working conditions of the seal.

2. A sealing device according to claim 1, wherein said seal and the second shield form an annular window in relation to each other, the annular window open to the inside of the rolling contact bearing and, also in relation to each other, a connecting portion of the tapered surface enabling the exit of contaminating agents from the sealing device.

3. A sealing device according to claim 1, wherein the sealing lip is substantially U-shaped and includes a concave section turned towards the outer race and towards the outside of the rolling contact bearing the sealing lip including a first arm extending from the connecting section towards the sliding surface, and a second arm extending from the sliding surface towards the second shield, with which the second arm comes into contact; the first arm having a decreasing thickness as the first arm extends towards the sliding surface.

4. A sealing device according to claim 3, wherein the first arm includes substantially in correspondence with the second arm, an annular sharp edge under the sliding surface; the second arm having a substantially constant thickness along the whole of a length.

5. A sealing device for a rolling contact bearing including an inner race and an outer race the inner race being coaxial to the outer race and to a rotational axis of the rolling contact bearing, the sealing device comprising:
   a first shield formed of metal coupled to the outer race, the first shield including a cylindrical portion assembled on the outer race: p1 a second shield formed of metal coupled to the inner race, the second shield including a cylindrical sliding surface; and
   a seal formed of synthetic material anchored to the cylindrical portion of the first shield such that the seal freely extends from and overhangs the cylindrical portion of the first shield, the seal having a shape in axial section tapering towards the cylindrical sliding surface of the second shield, and the seal including a sealing lip arranged to substantially contact the second shield, wherein the seal further includes a lateral notch axially open towards an interior of the rolling contact bearing and axially limited towards an exterior of the rolling contact bearing by a smooth surface, the smooth surface being transverse to the rotation axis.

6. The sealing device according to claim 5, wherein the first shield further includes a flange integral to the cylindrical portion of the first shield and radially limited towards an interior of the lateral notch.

7. The sealing device according to claim 5, wherein the seal further includes a tapered surface axially open towards the exterior of the rolling contact bearing, the tapered surface defining, together with the smooth surface, a connecting section between the sealing lip and the cylindrical portion of the first shield, the connecting section having a resistance to determined flexure so that the sealing lip maintains contact with the sliding surface of the second shield during variations in working conditions of the seal.

* * * * *